S. HARRIS.
Harrow.

No. 214,562.  Patented April 22, 1879.

Witnesses
Geo. H. Strong.
Frank A. Brooks

Inventor
Silas Harris
By Dewey & Co.
Attys

UNITED STATES PATENT OFFICE.

SILAS HARRIS, OF SAN FRANCISCO, CALIFORNIA.

IMPROVEMENT IN HARROWS.

Specification forming part of Letters Patent No. 214,562, dated April 22, 1879; application filed March 7, 1879.

*To all whom it may concern:*

Be it known that I, SILAS HARRIS, of the city and county of San Francisco, and State of California, have invented an Improved Harrow; and I hereby declare that the following is a full, clear, and exact description thereof.

My invention relates to certain improvements in metallic harrows; and my improvements consist in riveting on each side of the holes through the flat bars composing the harrow-frame a peculiarly-formed right-angled piece of spring-steel, the two pieces forming a roughened clamp for the harrow-tooth. The upper edges of these clamps are nearer together than the lower, so that as they are driven apart by the insertion of the tooth they gripe the tooth firmly and hold it in place, as is more fully described in the accompanying drawings.

Figure 1:
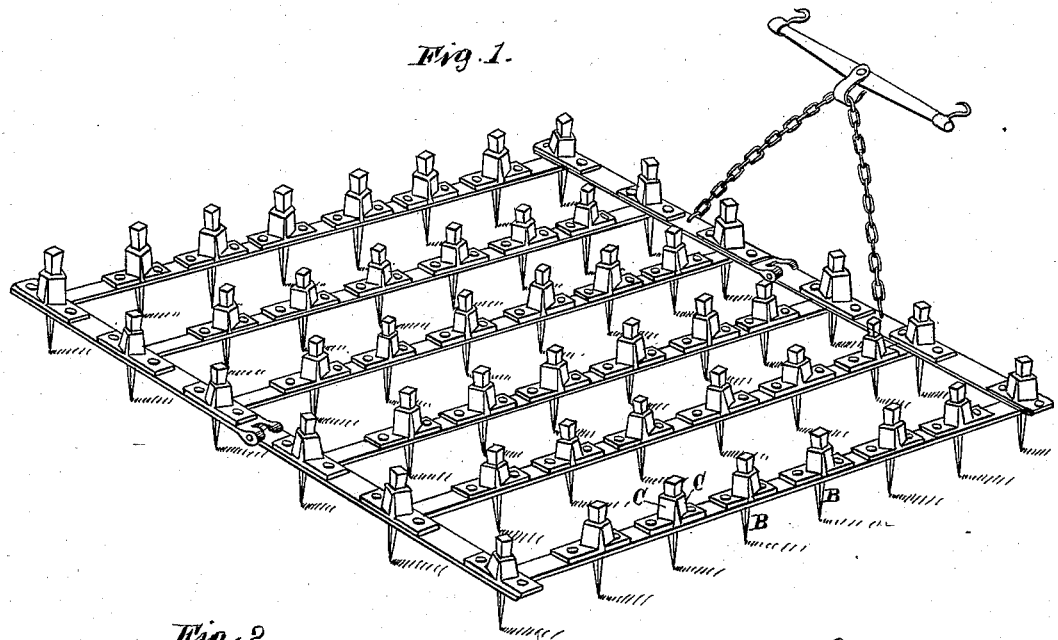
Figure 2:
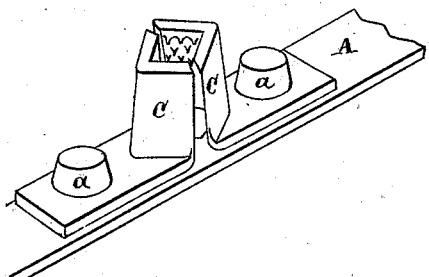
Figure 3:
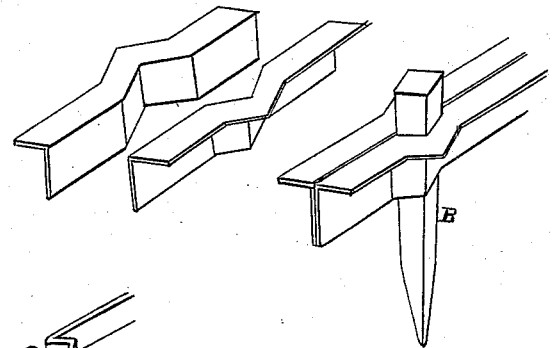
Figure 4:
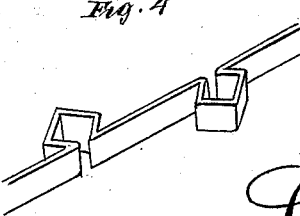

Figure 1 is a perspective view of my invention. Fig. 2 shows the construction of the same. Figs. 3 and 4 are modifications.

I prefer to make the harrow-frame A of flat bar-iron, perforated at suitable intervals for the reception of the teeth B. On the upper side of the bars, on each side of each hole, is placed a clamp, C, made of spring-steel, so as to have a certain amount of elasticity or spring. That part of the clamp which rests on the flat bar is made flat, and through it passes a rivet or bolt, *a*, which secures the clamp to the bar. The part of the clamp which is bent upward is forged like angle-iron, thus leaving a channel or groove on its inner face, so that the four sides of the two oppositely-placed clamps form a bearing for the tooth on all sides.

In forging or bending these clamps they are not turned quite to a right angle, and therefore when riveted in place the upper edges will be about an eighth or quarter of an inch nearer together than the lower edges. Then, as the tooth is gradually driven in, the upper edges are sprung apart until the tooth has a bearing on all sides and at top and bottom equally. The spring of the steel, however, causes the clamps to gripe the tooth firmly, requiring no wedging or other arrangement to keep it in place.

By the peculiar construction of the clamp, while the harrow-frame can be made thin and light, each tooth has at the same time a bearing for about one-third of its length, and cannot be loosened. The clamps gripe them firmly and hold them in place, and any tendency to throw them out of line by pressure at the lower end is counteracted by the spring action at the upper end of the bearing. The natural spring of the clamps by their peculiar construction, however, holds the teeth rigidly, so that no play is allowed. The inner faces of the teeth are roughened, as shown, to hold the teeth more firmly.

In Fig. 4, I have shown a modification of my device, in which a flat bar is bent at regular intervals into squares, as shown, so that when the tooth is driven in, the spring of the iron will be sufficient to hold it in place. This modification is intended for use where a very light harrow is desired.

Fig. 3 shows another modification, in which the spring of the iron holds the tooth in place. In this the harrow-frame is made of angle-iron bent at an angle at intervals. The two pieces are placed together, and where the bends have been made a square hole is left for the insertion of the teeth. On each side of the hole rivets are passed through, and the tooth driven in, and the two bars are slightly separated by the tooth. The upper flaring edge of the angle-iron then forms a very stiff spring, which firmly holds the tooth in place, while it has a bearing the whole width of the angle-iron.

I am aware that harrow-teeth have been driven through square openings in hollow tubing which forms the harrow-frame, and also that a frame of channel-iron has been bolted together, so that teeth are driven between the edges of the two sections, being simply held by the top and bottom edges alone.

I am also aware that a frame has been made composed of two flat bars set edgewise and bolted together, so as to receive harrow-teeth; I do not therefore claim, broadly, such devices; but,

Having thus described my invention, what I do claim as new, and desire to secure by Letters Patent, is—

The improvement in harrows, consisting of the elastic angle-plates C, bolted to or forming part of the harrow-frame, so as to give an elastic compressive bearing, whereby the tooth is held with an extended bearing, substantially as herein described.

In witness whereof I have hereunto set my hand.

SILAS HARRIS.

Witnesses:
 CHAS. C. YALE,
 FRANK A. BROOKS.